UNITED STATES PATENT OFFICE.

HENRY A. KOHMAN, TRUMAN M. GODFREY, AND LAUREN H. ASHE, OF PITTSBURGH, PENNSYLVANIA, ASSIGNORS TO WARD BAKING COMPANY, OF NEW YORK, N. Y., A CORPORATION OF NEW YORK.

SHORTENING COMPOSITION AND METHOD OF PRODUCING THE SAME.

1,242,883.      Specification of Letters Patent.      Patented Oct. 9, 1917.

No Drawing.      Application filed March 9, 1916. Serial No. 83,197.

*To all whom it may concern:*

Be it known that we, HENRY A. KOHMAN, TRUMAN M. GODFREY, and LAUREN H. ASHE, citizens of the United States, residing at Pittsburgh, Allegheny county, State of Pennsylvania, have invented certain new and useful Improvements in Shortening Compositions and Methods of Producing the Same; and we do hereby declare the following to be a full, clear, and exact description of the invention, such as will enable others skilled in the art to which it appertains to make and use the same.

The present invention relates to a shortening composition in a pulverulent condition adapted for use for shortening purposes in the manufacture of bread and other articles of food in the manufacture of which flour and a shortening agent are employed, and to a method of producing such shortening composition.

In the manufacture of leavened bread, it is customary to incorporate with the flour, yeast, salt, water, milk, and like ingredients of the dough batch, an appropriate quantity of a shortening agent, liquid at ordinary temperatures, and readily miscible therewith by the usual mixing and kneading apparatus employed in the trade.

The purpose of this shortening agent, as is well known, is to lessen the toughness of the baked loaf, to mature and age the dough so that its cell walls shall be of a finer and thinner texture, thereby contributing to whitening the loaf, and contributing to homogeneity in the size and distribution of the cells in the finished product.

With the ordinary dough batch, however, it is impracticable to increase the amount of liquid shortening employed beyond well established limits without seriously hampering the bread-making operation and without sacrifice of qualities in the finished product of a highly desirable character. Thus, from the operating standpoint, the dough, instead of being soft and sticky, should be fairly stiff, so that it will not tend to clog the dividing and molding machines, and so that it will have the springiness recognized as desirable in the dividing and molding operations. To obtain this stiffness or springiness of the dough batch, an appropriate amount of water should be employed. It is found, however, that the employment of a liquid shortening agent (say a vegetable oil, such as cotton-seed oil or the like) materially cuts down the amount of water which the dough will tolerate, and lessens the desired springiness of the batch. Moreover, in the finished loaf, the proportion of water present is likewise diminished, with a corresponding sacrifice of the normal freshness and flavor of the bread. Furthermore, to produce the desired shortening effect for bread of high quality, the quantity of the liquid shortener employed, although limited by the considerations just referred to, is often relatively considerable,—amounting, even in ordinary practice, to from 2 to 3 per cent. by weight of the flour employed in making up the dough batch.

The present invention is based upon the discovery that when a hard fat, immiscible as such with flour at ordinary temperatures, is brought into homogeneous admixture therewith, the resulting composition is of a nature which adapts it particularly for use as a shortening composition, and that by its use a shortening effect can be obtained with a small amount of the composition equal in value to that produced by relatively much larger quantities of liquid oil. So also, the employment of the novel shortening composition of the present invention in the manufacture of leavened bread is found to permit the use of sufficient water, not only to supply the amount required for giving the desired stiffness and springiness to the dough, but to supply, in the baked loaf, the quantity recognized as desirable for imparting to the bread the expected freshness and flavor. The employment of the novel composition of the present invention as the shortening agent is likewise found to add to the keeping qualities of the loaf in the sense that, even after the loaf has lost its original freshness, it lacks the rancidity frequently met with in ordinary bread which has been kept under the same conditions for the same period of time.

The novel shortening composition of the present invention comprises a homogeneous admixture of a hard fat of high melting point with flour, the resulting product containing the flour impregnated with the fat and being in a pulverulent condition and of a nature which adapts it for homogeneous distribution throughout the dough batch in the manufacture of bread, or other like products, where flour and a shortening agent are desired. The hard fat may be of either vegetable or animal origin,—as, for instance, hydrogenated edible vegetable oil (say, hydrogenated cotton-seed oil), hydrogenated edible animal oil, or oleo-stearin. In most instances, hydrogenated cotton-seed oil or other hydrogenated vegetable oil of an edible character is preferred, for the reason that such hydrogenated oils are relatively cheap, and can be hydrogenated or hardened up to a high melting point readily and conveniently. Thus, cotton-seed oil, having a melting point of 57° C. is well adapted to the purposes of the invention.

We have found that by melting the hard fat and heating it somewhat above its melting point and then mixing the flour therewith, the desired homogeneous admixture can be effected to give a resultant product in which the fat will be absorbed by the flour. The heating and mixing operations may be conveniently effected in a rotary drum, or the like, having a heating jacket, and provided interiorly with suitable mixing arms or stirrers. The temperature should be maintained, during the mixing operation, above the melting point of the fat, so that the flour shall not chill the mass, or the flour may be preheated, for the same purpose. It is found that, under these conditions, a quantity of flour equal in weight to from 5 to 10 times the weight of the melted fat, will absorb the fat, and that the flour will nevertheless retain its pulverulent condition, at the termination of the mixing operation, and after cooling, and will otherwise be fully adapted for use as a part of the flour constituent of the dough batch. The composition thus produced, containing the flour impregnated with the fat, is of a substantially homogeneous nature, and is pulverulent in form, so that, when it is added, for example, to a dough batch, the composition will be homogeneously distributed throughout the entire mass during the mixing and kneading operation.

The impregnation of the flour with the fat, or the absorption of the fat by the flour, can also be effected in the following manner:

The melted fat heated to a temperature of 200°C. and upward, may be supplied from a suitable melting and heating receptacle or the like to a discharge pipe from which it may be ejected, at a correspondingly high temperature, in the form of a fine spray or cloud, by a jet of air of appropriate temperature, volume and pressure, into an inclosed chamber. Into this chamber, the flour may be sifted in a disseminated falling body, whereupon the colder particles of flour, coming in contact with the highly heated particles of fat sprayed into the chamber, take up the fat, the flour thus impregnated with the melted fat remains in a pulverulent condition after cooling and is available for use for shortening purposes. In this case it is found that by repeating the absorbing operation a number of times, upon the same body of flour, a quantity of flour from 5 to 10 times the weight of the fat is sufficient to absorb the fat and yet remain in a pulverulent condition, suitable for use as a shortening composition, and that, when mixed, for example, with the dough batch, in the manufacture of bread, it is taken up homogeneously by the entire batch.

The flour can also be impregnated with the fat, although with less advantage, by dissolving the fat in an innocuous volatile solvent, mixing the flour with the resulting solution, and then evaporating the solvent. Thus, if such solutions are intimately mixed with the flour in suitable amount, and the solvent then allowed to evaporate, the hard fat will be deposited in or upon the flour in the desired state of subdivision, and the resulting composition can be used in the manner above described.

The flour or like material can further be impregnated with the hard fat, without first bringing the fat into a liquid state, as described above, by grinding or mechanically comminuting the fat in admixture with the flour. The flour or like material in this case prevents the clogging of the grinder and facilitates the comminuting operation; while the presence of the flour during grinding results in the direct production, as the result of the grinding operation, of an intimate and homogeneous admixture of the flour and fat. Thus, if the hard fat is mixed with the flour, in suitable amount, (for example, in amount equal to five or ten times the amount of fat) and passed through rolls such as are used in reducing wheat to flour, the reduction of the hard fat to a fine state of division, and the impregnation of the flour with the fat, will take place.

In the use of the novel composition of the present invention for shortening purposes in the manufacture of leavened bread, it is found that, with equally good results as to color, texture and expansion, an amount of the composition can be used in which the fat amounts to approximately $\frac{1}{20}$ the weight of the cotton-seed oil used ordinarily for the same purpose in making up the dough batch. Thus, in those instances where from two to three per cent of cotton-seed oil (calculated by weight on the amount of flour employed in the dough batch) is used, $\frac{1}{20}$ of that percentage by weight of hydrogenized cotton-seed oil having a melting point of 57° C. may be used, in the form of the novel shortening composition of the present invention, with like advantage as to the shortening effects desired, and with the production of a stiffer and springier dough, the viscosity of the dough being maintained, even though the absorption is increased, and the resultant baked loaf having the desired amount of moisture to give it the freshness and flavor desired.

It will be understood, that, instead of using flour as the absorbent carrier for the hard fat, we may employ any other suitable pulverulent carrier, appropriate as an ingredient of shortening compositions, as for instance, some other starchy material than the flour constituting the main bulk of the dough batch for making leavened bread or other food products in which shortening agents are employed. It will also be understood, however, that the use of flour as an absorbent carrier, and as a constituent for incorporation with the hard fat, is of particular value for the reason that it constitutes the main bulk of the materials to which shortening agents are commonly added.

What we claim is:

1. The method of making a pulverulent shortening composition having improved shortening qualities, which comprises bringing a hard fat of high melting point into homogeneous admixture with a pulverulent carrier, said homogeneous admixture being induced by bringing the fat into a pulverulent condition in the presence of a pulverulent carrier, the fat being thereby brought into a sufficient state of subdivision to permit homogeneous distribution throughout the dough batch in the manufacture of bread and of other products, whereby a marked economy in the amount of the fat required for shortening is effected; substantially as described.

2. The method of making a pulverulent shortening composition having improved shortening qualities, which comprises bringing a hard fat of high melting point into homogeneous admixture with a pulverulent carrier, said homogeneous admixture being induced by absorption of the fat while in a liquid state in the pulverulent carrier, the fat being thereby brought into a sufficient state of subdivision to permit homogeneous distribution throughout the dough batch in the manufacture of bread and of other products, whereby a marked economy in the amount of the fat required for shortening is effected; substantially as described.

3. The method of making a pulverulent shortening composition having improved shortening qualities, which comprises bringing a hard fat of high melting point into homogeneous admixture with a pulverulent carrier, said homogeneous admixture being induced by first melting the fat and bringing it into a pulverulent condition by absorption in the pulverulent carrier, the fat being thereby brought into a sufficient state of subdivision to permit homogeneous distribution throughout the dough batch in the manufacture of bread and of other products, whereby a marked economy in the amount of the fat required for shortening is effected; substantially as described.

4. The method of making a pulverulent shortening composition having improved shortening qualities, which comprises bringing a hard fat of high melting point into homogeneous admixture with a pulverulent carrier, said homogeneous admixture being induced by first melting the fat and mixing it with the pulverulent carrier at a temperature above its melting point, the fat being thereby brought into a sufficient state of subdivision to permit homogeneous distribution throughout the dough batch in the manufacture of bread and of other products, whereby a marked economy in the amount of the fat required for shortening is effected; substantially as described.

5. A pulverulent shortening composition, comprising a hard fat of high melting point associated with a pulverulent carrier in the form of a homogeneous admixture, said composition being in a sufficient state of sub-division to permit homogeneous distribution throughout the dough batch in the manufacture of bread and other products, whereby a marked economy in the amount of the fat required for shortening is effected; substantially as described.

6. A pulverulent shortening composition comprising a hard fat of high melting point associated with a pulverulent carrier by impregnation to form a homogeneous admixture, said composition being in a sufficient state of subdivision to permit homogeneous distribution throughout the dough batch in the manufacture of bread and other products, whereby a marked economy in the amount of the fat required for shortening is effected; substantially as described.

7. A pulverulent shortening composition comprising a hard fat of high melting point in a pulverulent condition associated with flour in the form of a homogeneous admixture, said composition being in a sufficient state of sub-division to permit homogeneous distribution throughout the dough batch in the manufacture of bread and other products, whereby a marked economy in the amount of the fat required for shortening is effected; substantially as described.

8. A pulverulent shortening composition comprising a hard fat of high melting point associated with flour by impregnation to form a homogeneous admixture, said composition being in a sufficient state of sub-division to permit homogeneous distribution throughout the dough batch in the manufacture of bread and other products, whereby a marked economy in the amount of the fat required for shortening is effected; substantially as described.

9. A pulverulent shortening composition comprising a hard fat of high melting point associated with a pulverulent material by impregnation of the material with the molten fat, said composition containing the pulverulent material and fat in the form of a homogeneous admixture, said composition being in a sufficient state of sub-division to permit homogeneous distribution throughout the dough batch in the manufacture of bread and other products, whereby a marked economy in the amount of the fat required for shortening is effected; substantially as described.

10. A pulverulent shortening composition comprising a hard fat of high melting point associated with flour by impregnation of the flour with the fat while in a liquid state, said composition containing the flour and fat in the form of a homogeneous admixture, said composition being in a sufficient state of sub-division to permit homogeneous distribution throughout the dough batch in the manufacture of bread and other products, whereby a marked economy in the amount of the fat required for shortening is effected; substantially as described.

11. A pulverulent shortening composition comprising a fat of melting point about 57° C. associated with a pulverulent carrier in the form of a homogeneous admixture, said composition being in a sufficient state of sub-division to permit homogeneous distribution throughout the dough batch in the manufacture of bread and other products, whereby a marked economy in the amount of the fat required for shortening is effected; substantially as described.

In testimony whereof we affix our signatures.

HENRY A. KOHMAN.
TRUMAN M. GODFREY.
LAUREN H. ASHE.